(12) United States Patent　　　　(10) Patent No.:　US 12,648,511 B2
Harmon　　　　　　　　　　　　　(45) Date of Patent:　Jun. 9, 2026

(54) AIR SEEDER PNEUMATIC CONTROL SYSTEM

(71) Applicant: DEERE & COMPANY, Moline, IL (US)

(72) Inventor: Andrew W. Harmon, Geneseo, IL (US)

(73) Assignee: Deere & Company, Moline, IL (US)

( * ) Notice: Subject to any disclaimer, the term of this patent is extended or adjusted under 35 U.S.C. 154(b) by 869 days.

(21) Appl. No.: 17/981,782

(22) Filed: Nov. 7, 2022

(65) Prior Publication Data

US 2024/0147895 A1　　May 9, 2024

(51) Int. Cl.
　　*A01C 15/00*　　(2006.01)
　　*A01C 7/08*　　(2006.01)
　　*A01C 15/04*　　(2006.01)

(52) U.S. Cl.
　　CPC .............. *A01C 15/006* (2013.01); *A01C 7/08*
　　(2013.01); *A01C 15/003* (2013.01); *A01C*
　　*15/04* (2013.01)

(58) Field of Classification Search
　　CPC ..... A01C 15/003; A01C 15/04; A01C 15/006;
　　　　A01C 7/08; A01C 7/081; A01C 7/082;
　　　　　　　　　　　　A01C 7/084
　　See application file for complete search history.

(56) References Cited

U.S. PATENT DOCUMENTS

| | | | | | |
|---|---|---|---|---|---|
| 6,158,363 | A | * | 12/2000 | Memory | A01C 7/102 |
| | | | | | 701/50 |
| 6,283,679 | B1 | * | 9/2001 | Gregor | A01C 7/125 |
| | | | | | 111/175 |
| 6,688,244 | B1 | * | 2/2004 | Meyer | A01C 7/081 |
| | | | | | 111/177 |
| 6,935,256 | B1 | * | 8/2005 | Meyer | A01C 7/081 |
| | | | | | 111/177 |
| 8,204,689 | B2 | | 6/2012 | Christy et al. | |

(Continued)

FOREIGN PATENT DOCUMENTS

| | | |
|---|---|---|
| EP | 2417846 A1 | 2/2012 |
| EP | 3150041 A1 | 4/2017 |

(Continued)

OTHER PUBLICATIONS

Extended European Search Report and Written Opinion issued in European Patent Application No. 23202052.9, dated Apr. 3, 2024, in 16 pages.

*Primary Examiner* — Jamie L McGowan
(74) *Attorney, Agent, or Firm* — Taft Stettinius & Hollister LLP; Stephen F. Rost

(57) ABSTRACT

A seeder assembly for placing a commodity in underlying soil, where the seeder has a chassis member with at least one ground engaging mechanism configured to contact an underlying ground, a row unit coupled to the chassis, a third tank coupled to the chassis and to the row unit, a second tank coupled to both the chassis and the third tank, and a first tank coupled to the second tank. The first tank may be a commodity cart. The first tank may have a metering system and a pneumatic distribution system that distributes the material throughout the seeder assembly. The second tank may include one or more sensors and a status indicator. The second tank may calibrate the metering system, using sensors or by using a load cell.

20 Claims, 9 Drawing Sheets

(56) References Cited

U.S. PATENT DOCUMENTS

| | | | | |
|---|---|---|---|---|
| 8,544,498 B2 * | 10/2013 | Petersen | .............. | A01C 7/084 |
| | | | | 111/175 |
| 8,635,963 B2 * | 1/2014 | Friggstad | ............. | A01C 7/084 |
| | | | | 111/175 |
| 8,690,488 B2 * | 4/2014 | Jagow | .................... | A01C 7/084 |
| | | | | 111/175 |
| 8,821,078 B2 * | 9/2014 | Hockett | ................ | B65G 47/72 |
| | | | | 111/175 |
| 9,651,536 B1 | 5/2017 | Lund et al. | | |
| 9,826,676 B2 * | 11/2017 | Borkgren | .............. | A01C 5/068 |
| 10,149,427 B2 * | 12/2018 | Bourgault | ............. | A01C 7/082 |
| 10,729,052 B1 | 8/2020 | Lund et al. | | |
| 11,067,560 B2 | 7/2021 | Lund et al. | | |
| 11,839,174 B2 * | 12/2023 | Johnson | ................ | A01C 7/082 |
| 11,930,735 B2 * | 3/2024 | Jagow | .................... | A01C 7/084 |
| 2007/0113764 A1 | 5/2007 | Audette | | |
| 2012/0316736 A1 | 12/2012 | Hubalek et al. | | |
| 2015/0098767 A1 * | 4/2015 | Beaujot | .................... | A01C 7/20 |
| | | | | 406/191 |
| 2016/0106026 A1 * | 4/2016 | Roberge | ................ | A01C 7/082 |
| | | | | 111/175 |
| 2016/0205866 A1 * | 7/2016 | Funck | ...................... | A01C 7/04 |
| 2016/0234996 A1 * | 8/2016 | Sauder | ................... | A01C 7/081 |
| 2016/0246296 A1 * | 8/2016 | Gelinske | ................ | H04W 4/70 |
| 2017/0156258 A1 * | 6/2017 | Reich | ..................... | A01C 7/084 |
| 2019/0208698 A1 | 7/2019 | Maxton et al. | | |
| 2019/0307057 A1 * | 10/2019 | Sauder | ................. | A01C 21/005 |
| 2020/0053955 A1 * | 2/2020 | Borkgren | .............. | A01C 7/102 |
| 2020/0117221 A1 * | 4/2020 | Turner | ................ | G05D 7/0611 |
| 2020/0337223 A1 * | 10/2020 | Snipes | ...................... | G01F 1/00 |
| 2021/0243945 A1 * | 8/2021 | Schmidt | .............. | A01C 21/005 |
| 2021/0267118 A1 * | 9/2021 | Plattner | ................. | A01C 7/105 |

FOREIGN PATENT DOCUMENTS

| | | | |
|---|---|---|---|
| EP | | 3150043 A1 | 4/2017 |
| WO | WO 2022056616 A1 | | 3/2022 |

* cited by examiner

AIR SEEDER PNEUMATIC CONTROL SYSTEM

FIELD OF THE DISCLOSURE

The present disclosure relates generally to row seeders for an agricultural machine, and more specifically to a row seeder having an intermediate tank.

BACKGROUND

Air seeders are frequently used as an agricultural machine to distribute seed and/or fertilizer. These machines often utilize one or more large volume tanks that feed a destination, which in some instances are third tanks, sometimes referred to as hoppers, that are located on row units. The third tanks often contain a small volume of seed and distributes the seed into the ground. Large volume tanks, also known as a first tank, are difficult to locate on the chassis of a traditional air seeder because of its large size. Even if one or more first tanks are placed on an air seeder chassis, this will create difficulties when the air seeder is folded. Therefore, one or more large volume tanks are commonly towed with the air seeder. In some instances the one or more first tanks are referred to as a commodity cart. Therefore, it is desirable to have medium size tanks, sometimes known as intermediate tanks or second tanks, on the air seeder that receives material from the one or more first tanks, and where each second tank distributes the material to one or more third tanks.

But difficulties may arise when using second tanks. When a first tank feeds a third tank, the row units stop getting seed and/or fertilizer when venturis located underneath the "large" tank no longer have sufficient airflow to produce a vacuum which picks up and entrains commodity. However when second tanks are introduced between the first tank and row unit hopper, the venturis are located under the intermediate tank. Thus, a method is prescribed to keep the intermediate tank full by filling it with the first tank. For these reasons, among others, there is a need for further improvements in this technological field.

SUMMARY

One embodiment is a seeder assembly for placing a commodity in the underlying ground. The seeder has a chassis with a first end and a second end; a row unit configured to couple to the chassis; a third tank configured to couple to the row unit; a second tank configured to couple to the third tank; and a first tank configured to couple to the second tank. In this embodiment, the first tank is configured to distribute an air and material mixture to the second tank, the second tank is configured to distribute the air and material mixture to the third tank, the third tank is configured to distribute the air and material mixture to the row unit, and further wherein the row unit is configured to distribute the material into ground.

In one example of this embodiment, the second tank further includes an inlet and an outlet, configured such that an air and material mixture enters the second tank through the inlet and exits the second tank through the outlet. It also includes a first chamber with a first level, a second chamber with a second level, and a screen with a first end and a second end, wherein the second end of the screen is coupled to the first chamber, and the first end of the screen is located above the second end. In this example, the screen partially partitions the first chamber from the second chamber, and the inlet is located at or above the height of the screen;

In another example of this embodiment, the outlet is coupled to a connection with one inlet and more than one outlet, such that one outlet may provide a seed and material mixture to two or more third tanks. The seeder assembly may also include a meter coupled to the first tank, wherein the meter controls the flow of material that is distributed from the first tank. Additionally, the meter is coupled to a controller, such that the controller provides input to the meter.

In another example of this embodiment, the seeder assembly further includes a first sensor coupled to the second tank at a first height and the first sensor is configured to detect whether the material collected in the first chamber has reached the height of the first sensor. The seeder assembly may also include a status indicator wherein the first sensor provides an input to the status indicator and the status indicator provides an output. The seeder assembly of this embodiment may additionally include a controller coupled to the first sensor and a status indicator in communication with the first controller. In this embodiment, the controller receives input from the first sensor and the controller provides input to the status indicator, and the status indicator receives input from the controller and provides an output. In this embodiment, the seeder assembly may also include a second sensor coupled to the second tank at a second height, wherein the second sensor detects whether the material collected in the first chamber has reached the height of the second sensor, further wherein height of the first sensor is greater than the height of the second sensor. This seeder assembly may further include, a controller operatively coupled to the first sensor and the second sensor; and a status indicator operatively coupled to the controller. The controller receives input from the first and second sensors and the controller provides input to the status indicator and the status indicator provides an output.

In another example of this embodiment, the seeder assembly may further include a load cell coupled to the second tank, wherein the load cell is configured to weigh a force upon it. In another example of this embodiment, the seeder assembly also includes a sensor coupled to the row unit, wherein the sensor counts the material that is distributed into the ground through the row unit.

In another example of this embodiment, the seeder assembly further includes a distribution line, wherein the second tank and the third tank are coupled with the distribution line.

In another embodiment a method for distributing seed is disclosed. The method includes: providing a seeder, a first tank, a second tank, a third tank, and a row unit; distributing an air and material mixture from the first tank to the second tank; distributing the air and material mixture from the second tank to the third tank; distributing the air and material mixture from the third tank to the air seeder; and distributing the material from the air seeder to an underlying ground.

In one example of this embodiment, the method further includes: providing a second tank with an inlet, an outlet, a first chamber with a first level, a second chamber with a second level, and a screen that partially partitions the first chamber from the second chamber; distributing the air and material mixture into the first chamber of the second tank through the inlet, wherein the material collects in the first chamber while the air continues flowing through the first chamber, through the second chamber, and out of the second tank via the outlet; continuing to distribute the air and material mixture into the first chamber such that the material collects in the first chamber and the material reaches a height that is at or above the screen. It also includes selectively moving material to the second chamber of the second tank when material in the first chamber reaches a height greater than the height of the screen; moving material out of the second chamber via the outlet; moving material from the outlet to the third tank; distributing material from the third tank to the row unit; and distributing material from the row unit to the underlying ground.

In another example of this embodiment, the method also includes: providing a first sensor coupled to the second tank, wherein the first sensor is located at a first height; and providing a status indicator that is in wireless communication with the first sensor; wherein the first sensor is configured to detect if the material collected in the first chamber has reached the first height. The status indicator may also receive input from the first sensor and the status indicator provides an output.

In another example of this embodiment, the method of further includes a second sensor coupled to the second tank, wherein the second sensor is located at a second height and wherein the sensor is configured to detect if the material collected in the first chamber has reached the second height. Also, the second sensor is in wireless communication with the status indicator, and the status indicator receives input from the second sensor and the status indicator provides an output.

Another embodiment may include a method of calibrating a meter. This method may include: providing a first tank and a second tank; distributing product from the first tank to the second tank by rotating the meter; collecting product in the second tank; determining via a first sensor when the product reaches a first threshold level and determining via a second sensor when the product reaches a second threshold level in the second tank; and determining a number of revolutions rotated by the meter between the product reaching the first threshold level and the second threshold level.

In another example, the method may further comprise coupling a first sensor to the second tank at the first threshold level and a second sensor to the second tank at the second threshold level, wherein the second threshold level is greater than the first threshold level.

Another embodiment may include the method of calibrating a meter, wherein the method further comprises coupling a load cell to the second tank; weighing the second tank via the load cell when the second tank is empty of any product; continuously transferring product into the second tank until the second sensor detects product at the second threshold level; and weighing the second tank via the load cell once the first sensor detects material at the first threshold level. In some embodiments, this method may further comprise determining the number of revolutions of the meter via a third sensor.

In another embodiment, the method may also include a load cell and a first sensor coupled to the second tank, wherein the load cell weighs the second tank when the second tank is empty. Additionally, material is distributed into the second tank until the first sensor detects material, and the load cell measures the weight of the second tank after the first sensor detects material.

In one example, the method may also include a third sensor, wherein the third sensor counts and provides an output of the number of revolutions made by the meter.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description.

Rather, the embodiments are chosen and described so that others skilled in the art may appreciate and understand the principles and practices of the present disclosure.

Figure 1:
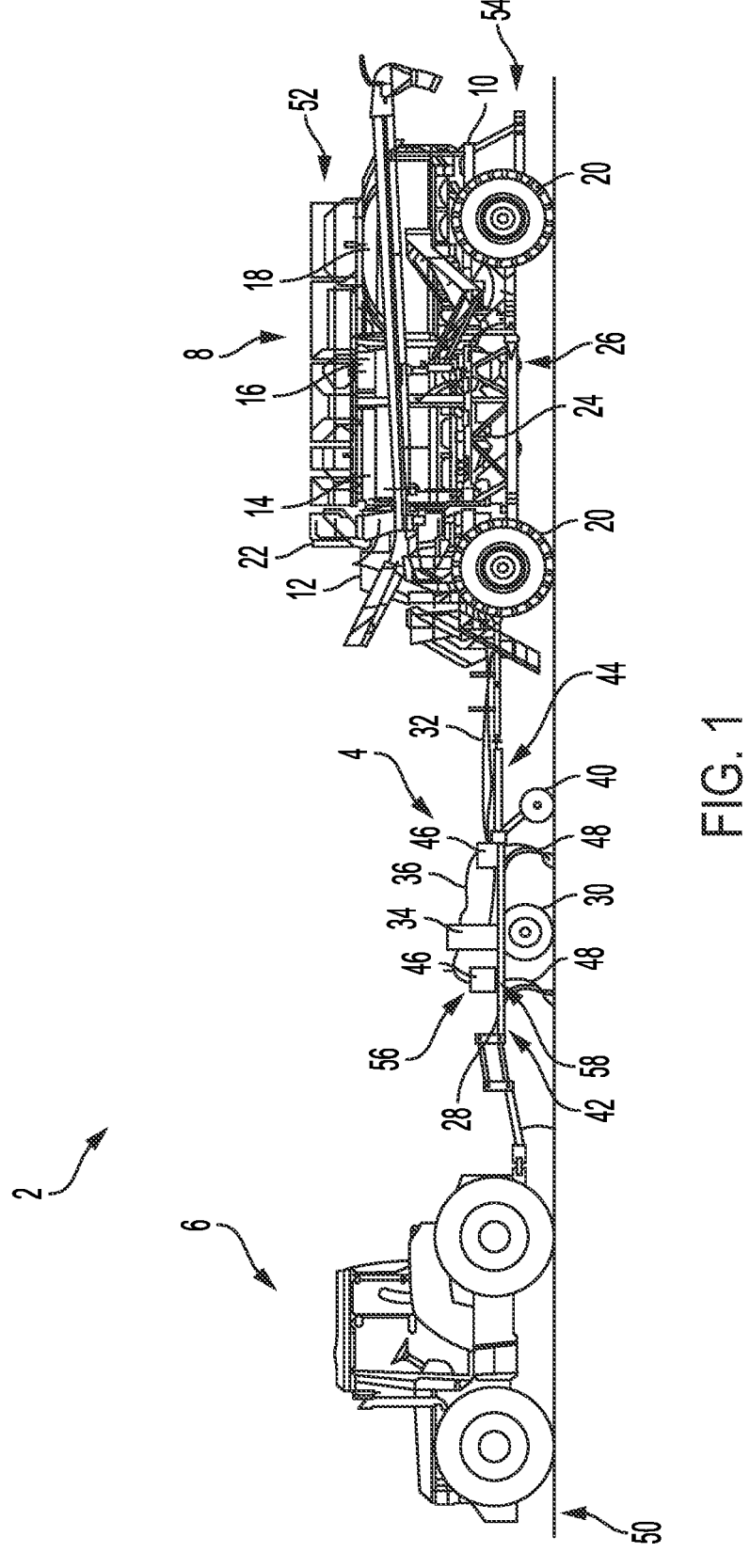
FIG. 1 is a side view of a seeder assembly.

Referring to FIG. 1, a seeder assembly 2 is illustrated. The seeder assembly 2 may include a seeder 4, a tractor 6, and one or more first tanks 12, 14, 16, 18. The seeder 4 may have a chassis 28 with a first end 42 and a second end 44, a seeder wheel 30, a firming wheel 40, a row unit 48, a third tank 46, and a second tank 34. The first end 42 of the chassis 28 may be coupled to the tractor 6, and the second end 44 of the chassis 28 may be coupled to one or more first tanks 12, 14, 16, 18. In some embodiments, the seeder 4 may be towed between the tractor 6 and the one or more first tanks 12, 14, 16, 18. In other embodiments, the one or more first tanks 12, 14, 16, 18 may be towed between the tractor 6 and the seeder 4. In another embodiment, the seeder 4 and the one or more first tanks 12, 14, 16, 18 may be combined to form a unified configuration, rather than a separate configuration. While certain configurations are provided, other configurations of the seeder assembly 2 is contemplated in this disclosure.

The row unit 48 may be coupled to the first end 42 of the chassis 28. The row unit 48 may also be coupled to the third tank 46. The row unit 48 may be configured to receive an air and material mixture from the third tank 46 and distribute the material in the ground 50. In some examples, the material may be seed. In other examples, the material may be fertilizer or pesticide. While certain materials are disclosed herein, it should be understood that any type of agricultural material may be distributed with the seeder assembly 2.

The third tank 46 may be coupled to the seeder chassis 28. The third tank 46 may also be coupled to the row unit 48. In one example, the third tank 46 and the row unit 48 may be coupled with a distribution line 36. In another example, the third tank 46 may be coupled to the top of the row unit 48, and the third tank 46 may distribute the air and material mixture into the row unit 48 without a distribution line 36. The third tank 46 may also be coupled to the second tank 34. In some embodiments, the third tank 46 and the second tank 34 may be coupled via a distribution line 36. The third tank 46 may be configured to receive the air and material mixture from the second tank 34 and to distribute the air and material mixture to the row unit 48.

As illustrated in FIG. 1, the seeder chassis 28 may have a plurality of row units 48 coupled thereto. The row units 48 may distribute seed into an underlying ground 50. More specifically, the row unit 48 may selectively cut an opening or furrow into the ground 50 and distribute material into the opening or furrow. The firming wheel 40 may then cover the opening or furrow after the material has been distributed. The row unit 48 may have a sensor (not pictured) that counts the amount of material distributed from the row unit 48. In one embodiment, the row unit 48 may be coupled to the first end 42 of the chassis 28. In other embodiments, the row unit 48 may be coupled to both or between the first end 42 and the second end 44 of the chassis 28. In still another embodiment, the row unit 48 may be coupled to the second end 44 of the chassis 28.

The second tank 34 may be coupled to the chassis 28 of the seeder 4. In one embodiment the second tank 34 may be coupled to the chassis 28, such that the second tank 28 does not impede the seeder 4 when the seeder 4 is in a folded or transport position. The second tank 34 may be configured to distribute the air and material mixture to the third tank 46 via a distribution line 36. The second tank 34 may also be coupled to the one or more first tanks 12, 14, 16, 18 via a flow passage 32, such as a hose or distribution line. The second tank 34 may be configured to receive the air and material mixture from the one or more first tanks 12, 14, 16, 18.

One or more first tanks 12, 14, 16, 18 may be coupled to the seeder 4. In one embodiment, the one or more first tanks 12, 14, 16, 18, may be coupled to a commodity cart 8. The commodity cart 8 may comprise a chassis 10, one or more first tanks 12, 14, 16, 18, one or more wheels 20, a metering system 24, and a pneumatic distribution system 26. The one or more first tanks 12, 14, 16, 18 may be configured to receive material, contain material, and distribute material. The tanks 12, 14, 16, 18 may be a hopper, bin, box, or any other type of container. Each of the tanks 12, 14, 16, 18 may have a door 22 (a representative door is labelled). In one example, the door 22 may releasably seal an opening at an upper end 52 of the one or more first tanks 12, 14, 16, 18 for filling the one or more first tanks 12, 14, 16, 18 with material.

The metering system 24 may include one or more meters (not pictured), louvers (not pictured), one or more motors (not pictured) a meter controller, and a sensor (not pictured). Each meter (not pictured) may include louvers that may be coupled to the motor and the louvers may be located within the housing. The louvers may turn via the motor within the housing. The louvers may move in a rotational direction within the housing. In one embodiment, material may enter the housing, travel at least partially around the housing being directed by the louvers and the housing, and the material may exit the housing, being controllably distributed into the pneumatic distribution system 26. The metering system 24 may be configured to controllably move material from the tanks 12, 14, 16, 18 into a pneumatic distribution system 26. In one example, the metering system 24 may be located at a lower end 54 of each tank 12, 14, 16, 18 so the metering system 24 may distribute the material from the tanks 12, 14, 16, 18 into the pneumatic distribution system 26 via rotating meters (not pictured). The sensor (not pictured) may detect the number of revolutions completed by the one or more meters (not pictured) and the sensor may provide an output of the number of revolutions. In one embodiment, each meter may have one sensor and each sensor may count the revolutions of one meter. In another embodiment, the sensor may detect the number of revolutions of one or more meters. In one embodiment, there may be one sensor that may detect the total number of revolutions of each meter in the metering system 24. The meters may be coupled to a controller 710 (see FIG. 7) on the second tank 34, such that the controller 710 provides input to the meters which regulates their speed, and therefore the corresponding fill level in the second tank 34. In one embodiment, the controller 710 communicates directly with the meters. In another embodiment, the meters may be coupled to a meter controller and the controller 710 communicates with the meter controller. In this embodiment, the meter controller may control the rate at which the meters distribute material. In some embodiments, the meter controller may utilize a look-up table to regulate the rate at which the meters distribute material.

The pneumatic distribution system 26 may include a fan (not pictured) coupled to a product delivery conduit structure, wherein the product delivery conduit structure may have multiple flow passages 32. The fan may create airstreams that direct air through the flow passages 32. In some embodiments, the material may be distributed from the one or more first tanks 12, 14, 16, 18 to the flow passages 32 via the metering system 24. In these embodiments, the airstreams created from the fan may move through the flow passages 32, and these airstreams may move the material through the flow passages 32 to the second tank 34.

Figure 2B:
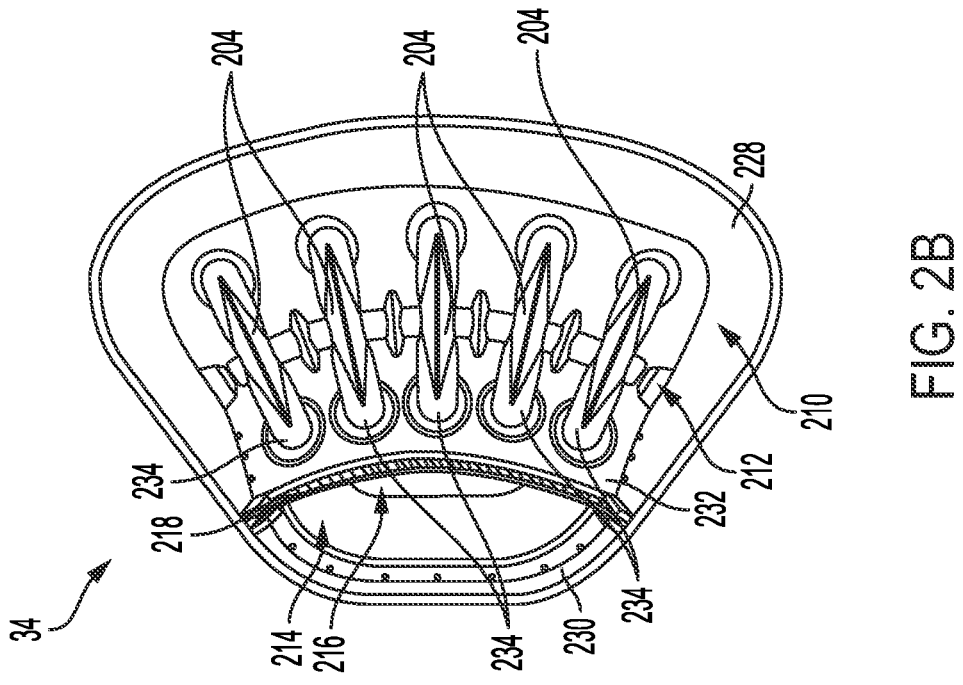
FIG. 2b is a top view of a second tank.
Figure 2A:
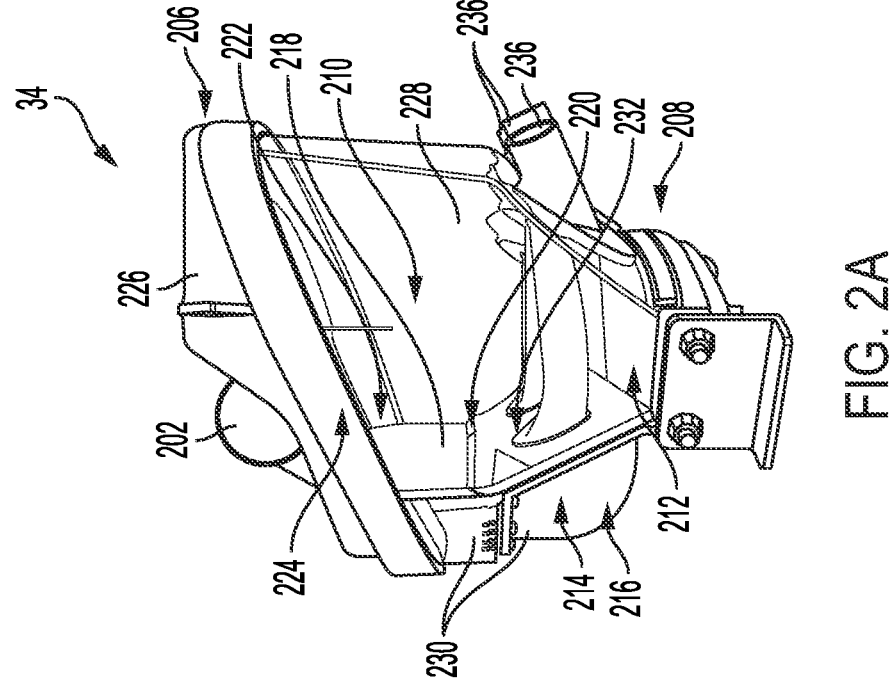
FIG. 2a is a side view of a second tank.
Figure 3:
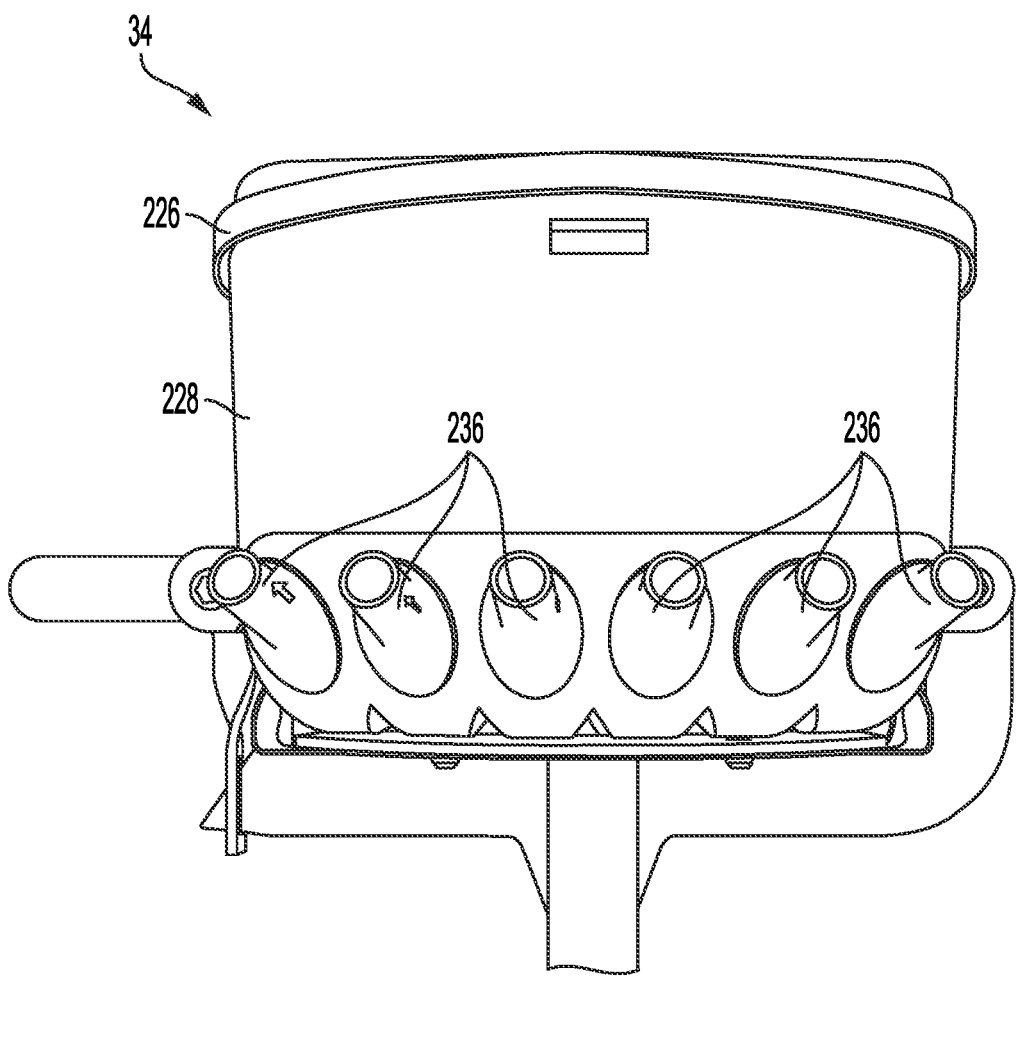
FIG. 3 is a rear view of a second tank.
Figure 4:
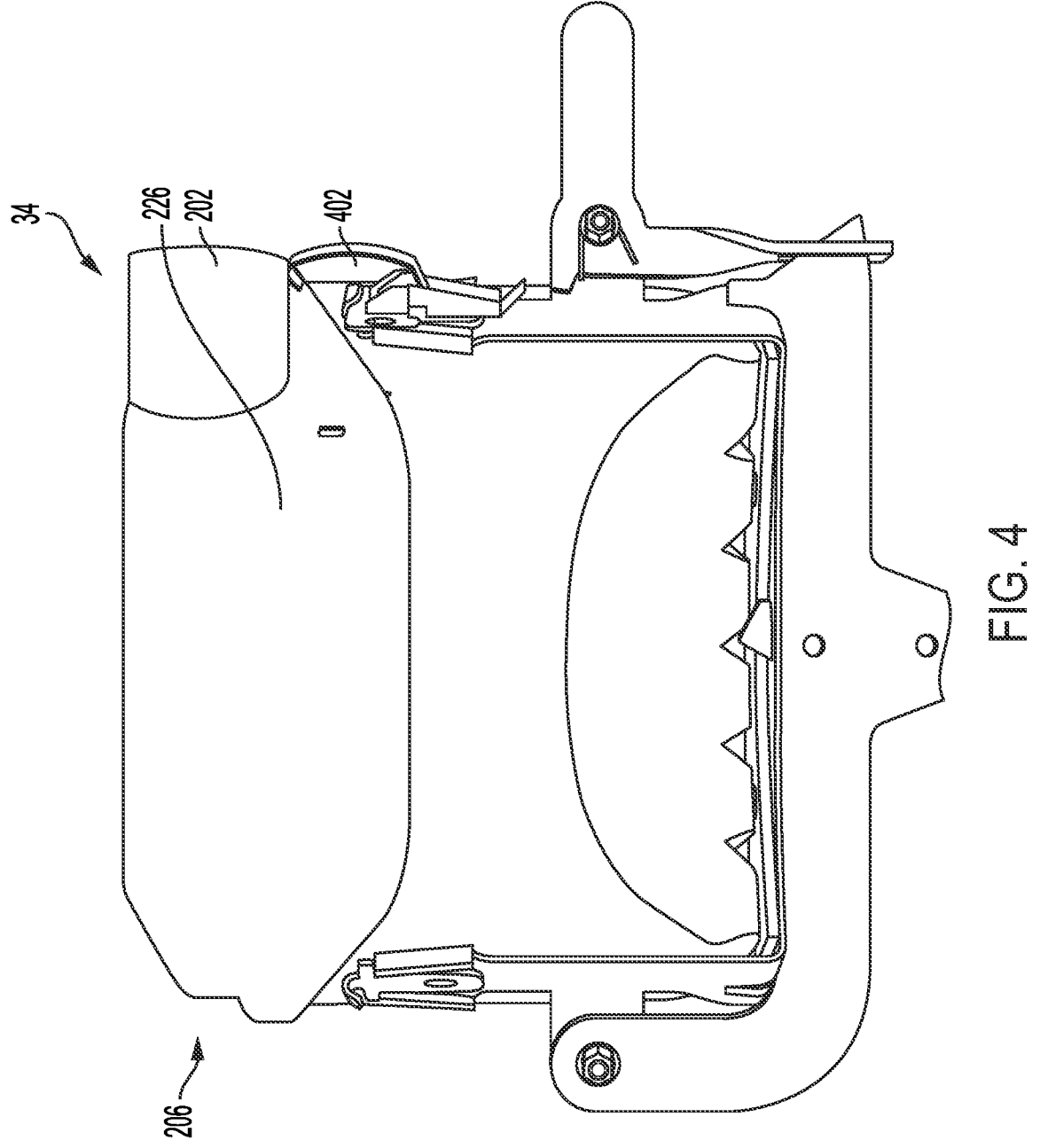
FIG. 4 is a front view of the second tank of FIG. 3.
Figure 5:
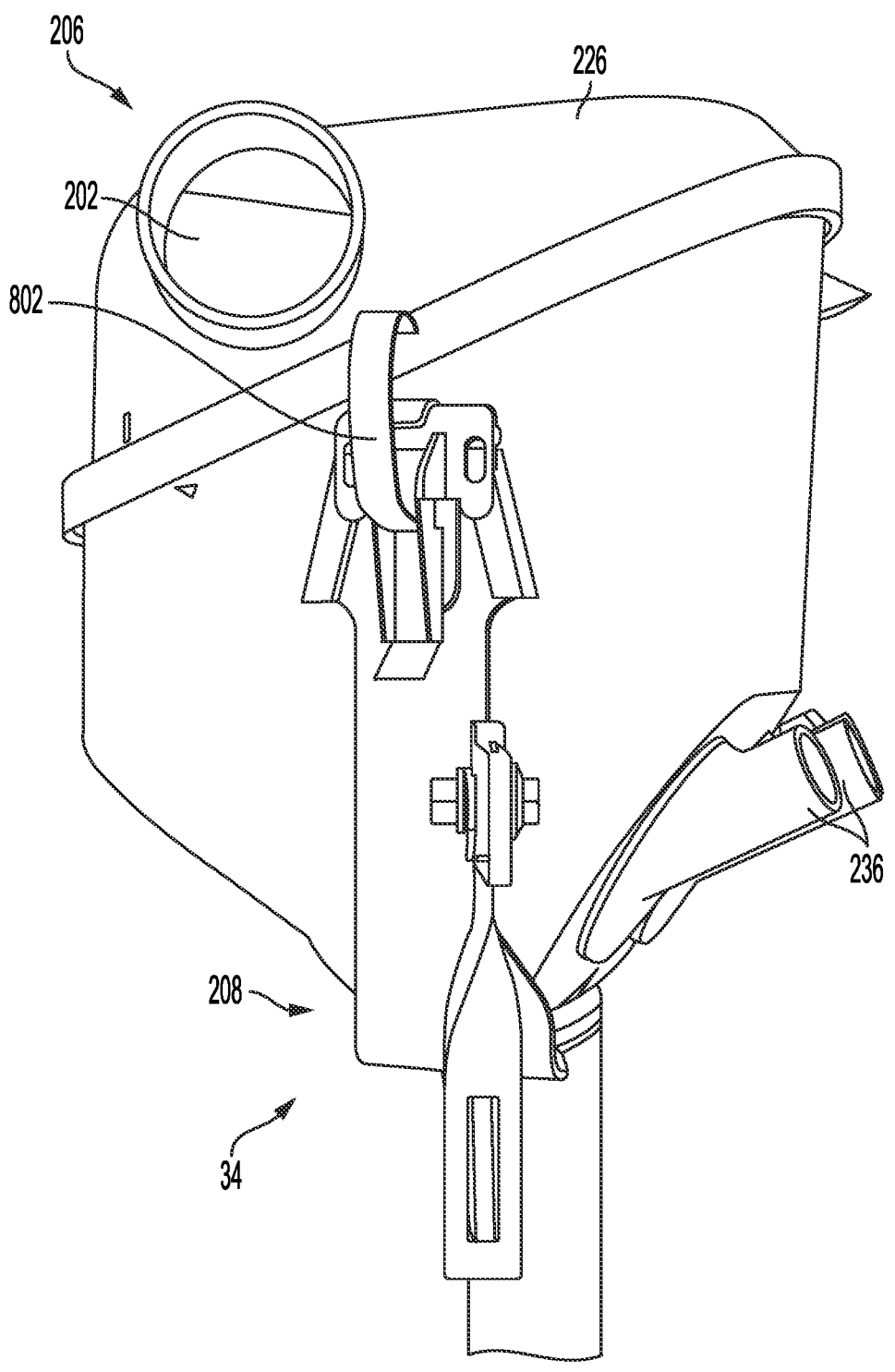
FIG. 5 is a side view of the second tank of FIG. 3.
Figure 6:
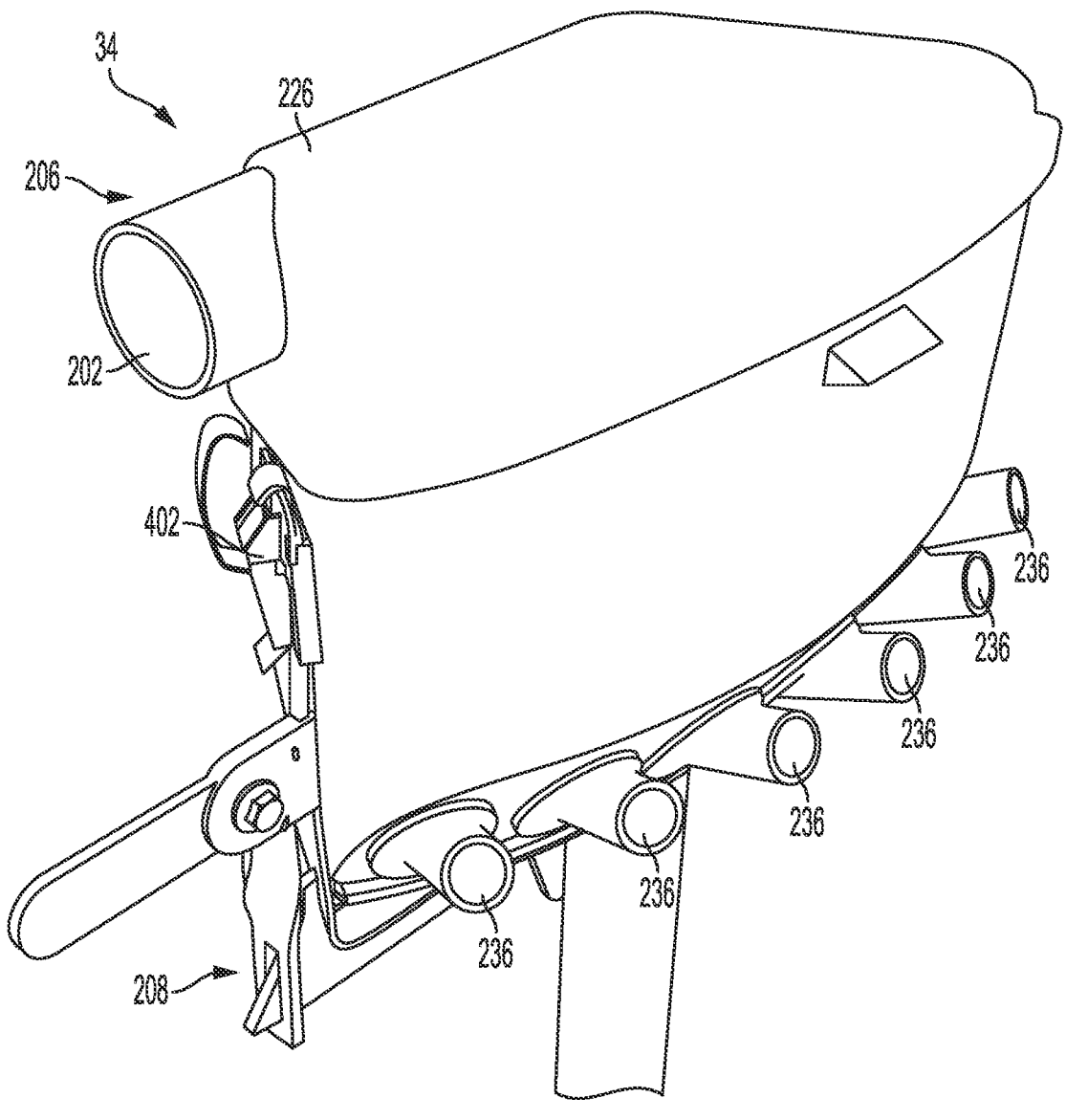
FIG. 6 is an elevated perspective view of the second tank of FIG. 3.

Referring now to FIGS. 2A and 2B, the second tank 34 may include a top end 206 and a bottom end 208. The second tank 34 may further include an inlet 202, one or more outlets 204, a first chamber 210, a first level 212, a first wall 228, a second chamber 214, a second level 216, a second wall 230, a screen 218, and a lid 226.

The inlet 202 may be located near the top end 206 of the second tank 34. In one embodiment, the inlet 202 may be defined in a radial side 224 of the second tank 112. In another embodiment, the inlet 202 may be located near the top end 206 of the second tank 34 and may enter the second tank 34 through the top end 206 of the second tank 34. The inlet 202 may be configured to receive the air and material mixture from the one or more first tanks 12, 14, 16, 18 and to direct the air and material mixture into the first chamber 210 of the second tank 34.

The first chamber 210 may be defined by the first level 212, the first wall 228, the screen 218, and the lid 226. The first level 212 may be located at or near the bottom end 208 of the second tank 34. In one embodiment, the first level 212 is the bottom portion of the first chamber 210. The first level 212 may be coupled to the first wall 228. The first wall 228 may radially surround the first level 212. The first wall 228 may extend from the first level 212 to the lid 226 of the second tank 34 along each side except for a short side 232. The short side 232 of the first wall 228 may not extend completely to the lid 226. In other words, the short side 232 may be located closer to the bottom end 208 of the second tank 34 than the first wall 228. The short side 232 of the first wall 228 may be configured to be removable coupled to the screen 218. In one embodiment, when the screen 218 is coupled to the short side 232, there may be a gap (not pictured) between the first end of the screen 222 and the lid 226. This gap (not pictured) may be configured so material may travel over the screen 218 and into the second chamber 214.

The screen 218 may partially partition the first chamber 210 from the second chamber 214. The screen 218 may have a first end 222 and a second end 220, and the second end 220 of the screen 218 may be coupled to the short side 232 of the second tank 34. The first end 222 of the screen 218 may be located closer to the top end 206 of the second tank relative to the second end 220 of the screen 218. The screen 218 may be configured such that both the first end 222 and second end 220 are located below the inlet 202. In other words, both the first end 222 and second end 220 of the screen 218 may be located closer to the bottom end 208 of the second tank 34 than the inlet 202. In one embodiment, the screen 218 may be configured such that it is in a vertical position. In some embodiments, the screen 218 may have one or more holes in it. In one example of this embodiment, the holes in the screen 218 may be configured such that air may pass through the holes in the screen 218 but the material may not pass through the holes. In another embodiment, the screen 218 may include a system of intersecting members, such as a mesh, wherein the air may pass through the mesh but material may not pass through the mesh.

The second chamber 214 may comprise a second level 216, and a second wall 230. In one example, the second chamber 214 may be defined by the second wall 230, the second level 216, the screen 218, and the short side of the first wall 232. The second chamber 214 may be coupled to the first chamber 210. In one embodiment, as illustrated in FIG. 2A, the first wall 228 may be configured from one or more components, and the second wall 230 may be configured from one or more components. In another example, the first wall 228 and the second wall 230 may be configured from one component, wherein the first wall 228 and second wall 230 refer to different portions of this one component. The second chamber 214 may be configured to receive air and material from the first chamber 210 and to direct the air and material to the one or more outlets 214.

In one example, the material and air mixture may enter the first chamber 210 through the inlet 202. The material may drop to the first level 212, and the air may exit the first chamber 210 by passing through the screen 218 or by passing through the gap (not pictured) formed between the first end 222 of the screen 218 and the lid 226. As the air and material mixture continues to enter the first chamber 210, the material may form a collect on the first level 212, and the height of the collected material may rise in the direction towards the top end 206 of the second tank 34. While the highest portion of the material collection may be below the first end 222 of the screen 218, the material may be constrained to the first chamber 210. In some embodiments, the height of the material collection may rise above the first end 222 of the screen 218. In these embodiments, the material located above the first end 222 of the screen 218 may move to the second chamber 214 through the gap (not pictured) formed between the first end 222 of the screen 218 and the lid 226. In one example, the material may be moved from the first chamber 210 to the second chamber 214 by the air that is passing from the first chamber 210 to the second chamber 214. In another example, the material may be moved from the first chamber 210 to the second chamber 214 by gravity. In still another example, the material may be moved from the first chamber 210 to the second chamber 214 by an external force, (e.g. a fan). In another example, the material may be moved from the first chamber 210 to the second chamber 214 by one or more of air, gravity, and an external force.

In some embodiments, the material may substantially cover the screen 218 and inhibit air from passing through the screen 218. In these embodiments, the air may pass from the first chamber 210 to the second chamber 214 by passing between the gap formed between the first end 222 of the screen 218 and the lid 226.

After passing through the gap, the air and material may move into the second chamber 214. The air traveling through the second chamber 214 may move the material out of the second chamber, and the air and material may exit the second chamber 214 via one or more outlets 204. In one embodiment, more material may enter the second chamber 214 than material that exits the second chamber 214. In this embodiment, material may collect on the second level 216. In another embodiment, the second chamber 214 may have a collection of material located on the second level 216. In this embodiment, more material may exit the second chamber 214 than material that enters the second chamber 214, and the pile of material may be reduced. In another embodiment, little to no material may enter the second chamber 214, but the air may enter the second chamber 214 and exit through one or more outlets 204.

In one embodiment, the short side 232 of the first wall 228 may have one or more through-holes or openings, and the first wall 228 may additionally have one or more through-holes or openings that are not located in the short side 232. In this embodiment, a first end 234 of the outlets 204 may extend through the one or more through-holes in the short side 232. The outlets 204 may continue extending through the first chamber 210, and a second end 236 of the outlets 204 may extend through the through-holes in the first wall 228 that are not located in the short side 232. In another embodiment, the first end 234 of the outlets 204 may be coupled to the first chamber 210 at the short side 232 of the first wall 228. The outlets 204 may extend through the first chamber 210, and the second end 236 of the outlets 204 may exit the first chamber 210 through the first wall 228. In this embodiment, the short side 232 of the first wall 228 may have one or more through-holes configured such that air and material may move from the second chamber 214 into the first end of the outlets 234. The first wall 228 may also have one or more through-holes located near the second end 236 of the outlet 236 configured such that the outlets 204 may extend through the through-holes or openings and may exit the first chamber 210.

In some embodiments, the outlets 204 are configured so air and material may move from the second chamber 214, into the first end 234 of the outlet 204, move through the outlet 204 towards the second end 236 of the outlet 204, and move out of the second end 236 of the outlet 204. The second end 236 of the outlet 204, for example, may be coupled to the third tank 46. In one embodiment, the outlet 204 may be coupled to the third tank 46 via a distribution line 36. In some embodiments, the second end 236 of one or more outlets 204 may be coupled to one or more Y-connectors, and each Y-connector may be coupled to a pair of third tanks 46 by distribution lines 36. In some embodiments, the second end 236 of one or more outlets 204 may be coupled to one or more double Y-connectors, and each double Y-connector may be coupled to at least three third tanks 46 by distribution lines 36. In another embodiment, the outlets 204 may be coupled to a connector that splits into more than three outlets, wherein one outlet 204 may distribute into three or more third tanks 46.

In one embodiment, each second tank 34 may have one or more outlets 204. In another embodiment, each second tank 34 may have a plurality of outlets 204. In another embodiment, each second tank 34 may have three outlets 204.

In FIG. 1, the third tank 46 may be a container that includes an air outlet (not pictured), a material outlet (not pictured), a top end 56, and a bottom end 58. The third tank 46 may be configured such that it may receive, store, and distribute air and material. The third tank 46 may be a hopper, bin, box, or any other type of container. In one embodiment, the air outlet may be located at a radial side of the third tank 46 near the top end 56 thereof. In another embodiment, the air outlet may be located on the top end 56 thereof. The air outlet may be configured to allow air to exit the third tank 46, and it may further be configured so material may not exit the third tank through the air outlet. In one embodiment, the material outlet may be located at a radial side of the third tank 46 near the bottom end 58 thereof. In another embodiment, the material outlet may be located on the bottom end 58 thereof. The material outlet may be configured such that either air, material, or a combination thereof may exit the third tank 46 through said nozzle. As described above, the third tank 46 may be coupled to the row unit 48, and the row unit 48 may receive, store, and distribute material, air, or an air and material mixture into the ground 50.

In one embodiment a second tank 34 may be coupled to more than one third tank 46, and more material may enter one of the third tanks 46 than exits therefrom. In this embodiment, material may accumulate and form a collection on the bottom end 58 of the third tank 46. In one example of this embodiment, the height of the collection may rise towards the top end 56 of the third tank 46 until the air outlet is covered by the seed. In this example, material may stop entering the third tank 46 because there is no airflow to move the seed from the second tank 34, through the distribution line 36, and into the third tank 46. In this example, the air and material may continue to flow through other third tanks 46 that are also connected to the second tank 34. In this example, air may not exit one third tank 46 until material exits another third tank 46 and the air nozzle of the one third tank is at least partially uncovered. In this embodiment, each third tank 46 coupled to the second tank 34 may operate independently of the other third tanks 46 coupled to the second tank 34. In one example, none of the air outlets may be covered by material, and material may enter each of the third tanks 46. In another example, all of the third tanks 46 that are coupled to the second tank 34 may have air outlets that are covered with material, and material may not enter any of the third tanks 46 until one or more air outlets are at least partially uncovered. In still another example, some of the third tanks 46 coupled to the second tank 34 may have air outlets that are covered with material, and other third tanks 46 coupled to the second tank 34 may have air outlets that are at least partially uncovered. In this example, material may enter the third tanks 34 that have an air outlet that is at least partially uncovered, and material may not enter the third tanks 46 that have an air outlet that is covered.

Referring now to FIGS. 3-6, the lid 226 may be removably coupled to the second tank 34. The lid 226 may be removably coupled to the second tank 34 with one or more lid coupling devices 402. The lid coupling device 402 may be a hinge latch, latch, button, hook and loop fastener, a belt and buckle fastener, a cinched buckle, a side release clip, or any other device known in the art to secure a lid. In some embodiments, the lid 226 may be rotatably coupled to the second tank 34. In other embodiments, the lid may be removably coupled to the second tank 34 such that the lid 226 may be lifted off of the second tank 34.

Figure 7:
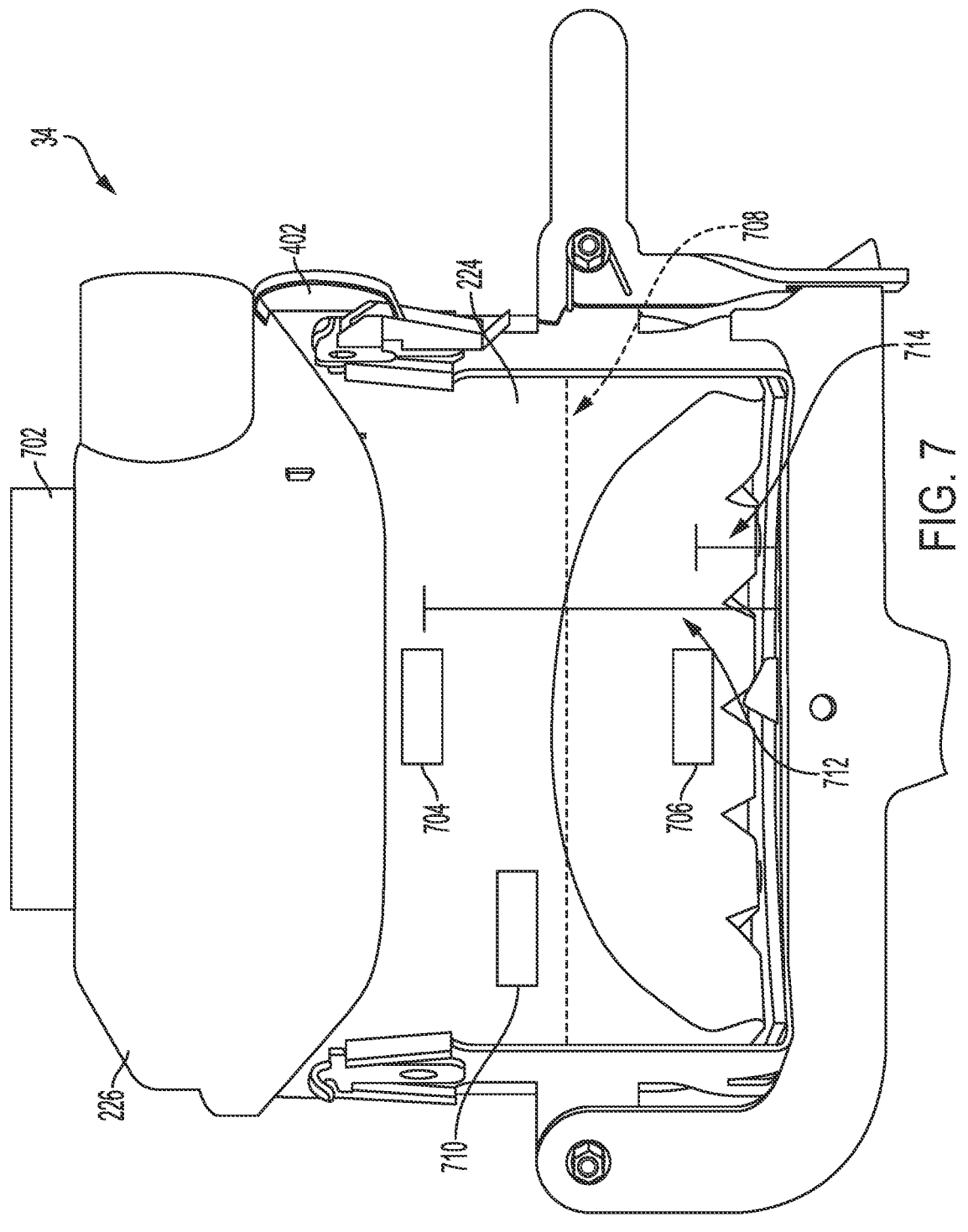
FIG. 7 is a front view of a second tank with a status indicator, two sensors, and a controller.

Referring now to FIG. 7, the second tank 34 may include a status indicator 702, a first sensor 704, and a second sensor 706. In one embodiment, the first and second sensors 704, 706 may be located on an exterior radial side 224 of the second tank 34. The first sensor 704 may be located at a first height 712, and the second sensor may be located at a second height 714, where the first height 712 may be greater than the second height 714. In other words, the first sensor 704 may be closer to the lid 226. In some embodiments, the status indicator 702 may be located on the lid 226. In other embodiments, the status indicator 702 may be located on an exterior radial side 224 of the second tank 34. The status indicator 702 may provide a notification. The notification may be a visual notification such as, for example, a display of a colored light, a flashing light, and/or providing a notification to an operator of a tractor 6.

The first sensor 704 and second sensor 706 may detect the level of material 708 in the tank. The first and second sensors 704, 706 may be coupled to a controller 710. In one embodiment, the first and second sensor 704, 706 may be proximity contact sensors that can sense whether the material level 708 has reached the corresponding height of the sensor 704, 706 in the tank 34. The first and second sensors 704, 706 may be removable and replaceable.

The controller 710 may receive input from the first and second sensor 704, 706, and may provide input to the status indicator 702. The controller 710 may include a transmitter capable of providing input to an external device. The controller may receive power from a power source (not pictured). The controller may also provide power to the first and second sensors 704, 706 and the status indicator 702. In one embodiment, the controller 710 may be hardwired to a power source, and it may also be hardwired to the first and second sensors 704, 706 and the status indicator 702. In one embodiment, the power source may be a battery.

In one embodiment, the first sensor 704 may detect no material and the second sensor 706 may detect material. In this embodiment, the status indicator 702 may provide a first notification indicative of the level of material 708 in the tank 34. In one example of this embodiment, the first notification may be green flashing lights. In another embodiment, the first sensor 704 may detect no material and the second sensor 706 may detect no material. In this embodiment, the status indicator 702 may provide a second notification. In one example of this embodiment, the second notification may be yellow flashing lights. In another embodiment, the first sensor 704 may detect material and the second sensor 706 may detect material. In this embodiment, the status indicator 702 may provide a third notification. In one example of this embodiment, the third notification may be green lights that are not flashing. In still another embodiment, the first sensor 704 may detect material and the second sensor 706 may detect no material. In this embodiment, the status indicator 702 may provide a fourth notification. In one example of this embodiment, the fourth notification may be red lights that are not flashing. This may be a diagnostic or other notification indicating a problem with one or both sensors 704, 706.

Figure 8:
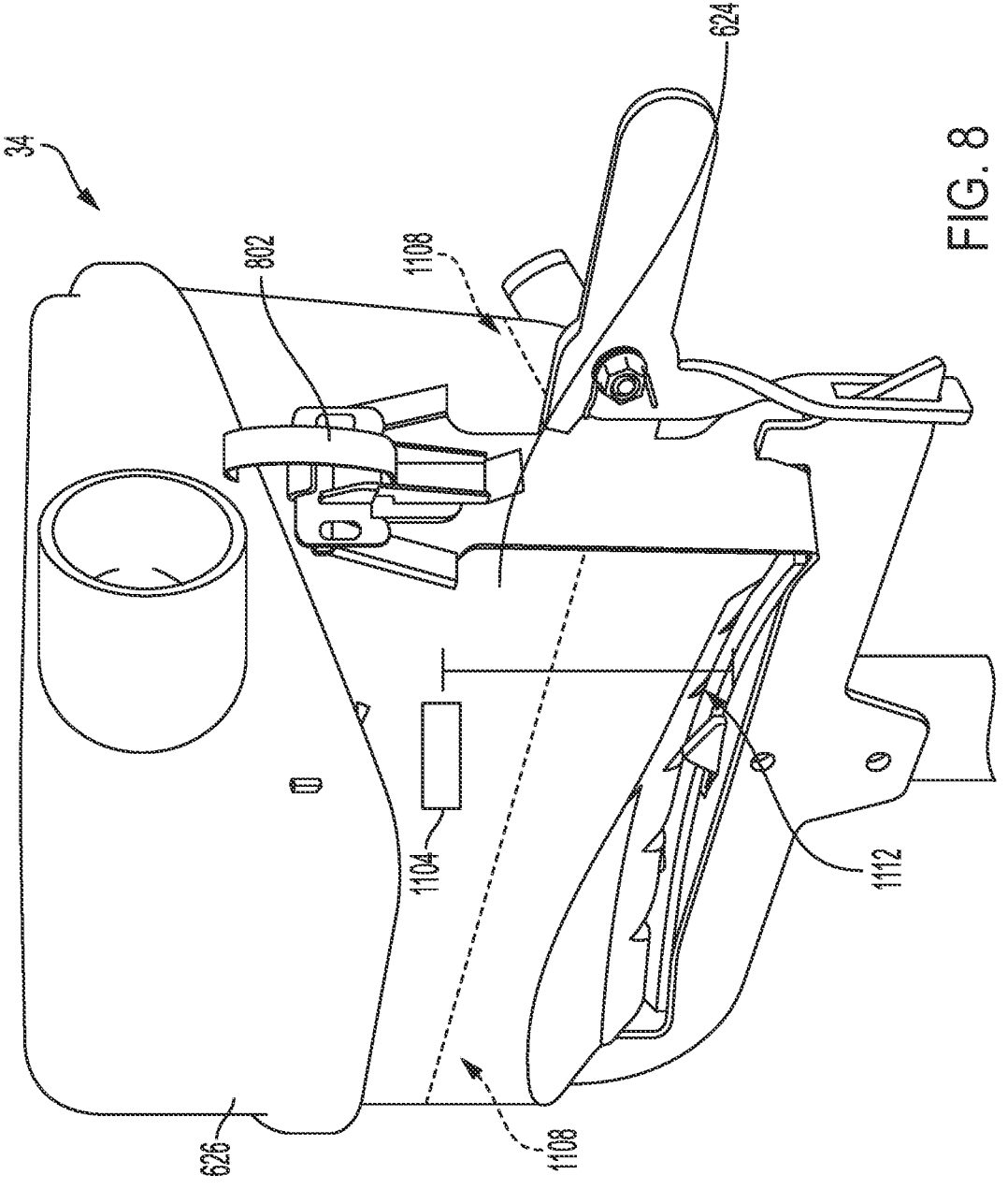
FIG. 8 is a side view of a second tank with one sensor.

Referring now to FIG. 8, rather than having a first and second sensor 704, 706, the second tank 34 may have only one sensor 704. In one embodiment, the sensor 704 may be located on an exterior radial side 224 of the second tank 34. In this embodiment, the sensor 704 may be a proximity sensor, and may detect whether the material level 708 has reached the height 712 of the sensor 704. In another embodiment, the sensor 704 may be an ultrasonic sensor. In this embodiment, the sensor may be located on the lid 226, and may detect the height of the first material level 708. The sensor 704 may be any type of sensor capable of detecting a material level in the tank 34.

In some embodiments, the sensor 704 may have the status indicator 702 integrated into it. In this embodiment, in addition to detecting the material level 708, the sensor 704 may also provide a notification. In one example of this embodiment, the sensor 704 may be hardwired to an external battery. In another example of this embodiment, the sensor 704 may have an internal battery. The notification provided by the sensor 704 may be a visual notification, such as displaying a colored light, displaying a flashing light, displaying a colored flashing light, and/or providing a notification to an external device. In some embodiments, the notification may be an audible signal. In other embodiments, the notification may be a visual and audible signal.

In another embodiment, the sensor 704 may not have the status indicator 702 integrated into it. In this embodiment, the sensor 704 may communicate with a controller 710, and the controller 710 may communicate with a status indicator 702. The controller 710 may receive input from the first controller 704 and may provide input to the status indicator 702. The controller 710 may also provide input to an external device. The controller may be powered by and receive power from a power source. The controller 710 may also provide power to the sensor 704 and the status indicator 702. In one embodiment, the controller 710 may be hardwired to a power source, the sensor 704, and the status indicator 702. In one embodiment, the power source may be a battery. The notification provided by the status indicator 702 may be a visual notification such as displaying a colored light, displaying a flashing light, displaying a colored flashing light, and/or providing a notification to an external device. In some embodiments, the notification may be an audible signal. In other embodiments, the notification may be a visual and audible signal.

Figure 9:
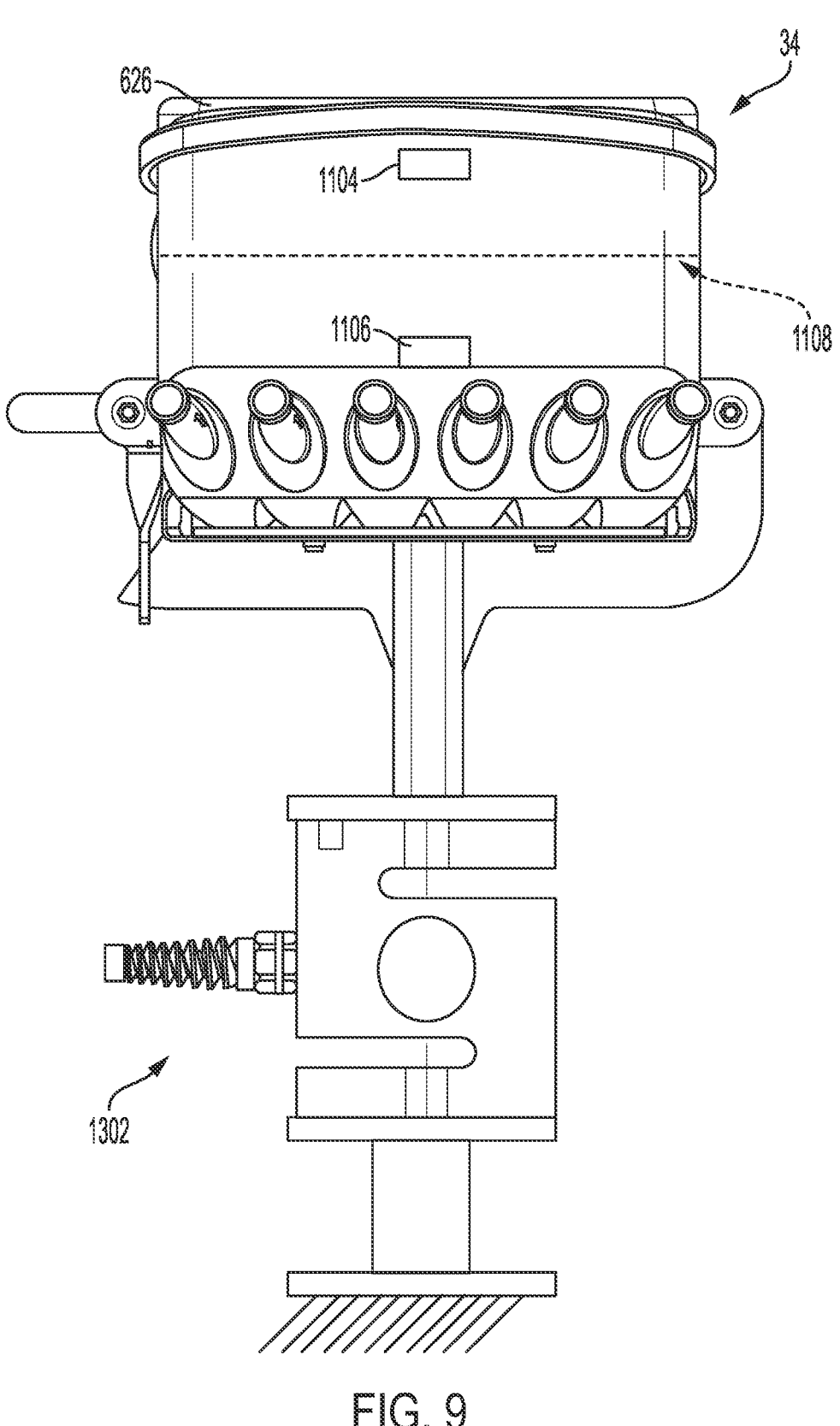
FIG. 9 is a rear perspective view of a second tank and a load cell.

Referring now to FIG. 9, the second tank 34 may be coupled to a load cell 902. The load cell 902 may weigh the second tank 34 and any other forces upon it. The load cell 902 may be coupled to the controller 710. The controller 710 may provide power to the load cell, and the load cell 902 may continuously be measuring the weight upon it. In one embodiment, the load cell 902 may display the weight. In another embodiment, the load cell 902 may provide the weight to the controller 710, and the controller may provide the weight to a device. The device may be a display or monitor in the cab of the tractor 6, a mobile or remote device, a stationary device, or any other type of device.

In one embodiment, the metering system 24 may be calibrated using the first and second sensors 704, 706. In this embodiment, material may enter the second tank 34 until the second sensor 706 detects material. Then, the number of rotations of the metering system 24 may be detected by a sensor and the material may resume entering the second tank 34. In this embodiment, the second tank 34 may be filled and the rotations of the metering system 24 may be detected until the first sensor 704 detects material. In one example of this embodiment, the rotations of the metering system may be counted, or detected, by a sensor (not pictured).

In another embodiment, the load cell 902 may calibrate the metering system 24 using a single sensor 704. In this embodiment, the volume of the second tank 34 below the sensor 704 may be either known or measured. In one example of this embodiment, the weight of the empty second tank 34 may be measured with the load cell 902. In another example of this embodiment, the weight of the second tank 34 may be measured when there is a known volume or known amount of material in the second tank 34. In this embodiment, material then resumes entering the second tank 34, and as material is distributed into the second tank 34, the rotations of the metering system 24 may be counted or detected by another sensor. When the sensor 704 detects material, material may stop being distributed and the number of rotations of the metering system may be provided.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A seeder assembly for dispensing product, comprising:
a chassis having a first end and a second end;
a row unit coupled to the chassis;
a first tank configured to contain a product, wherein the first tank is disposed along a flow path;
a second tank fluidly coupled to the first tank via the flow path, wherein the second tank is configured to receive product from the first tank, the second tank comprising a first chamber, a second chamber, and a screen, the screen permitting air flow while retaining product in the first chamber until a height of the product in the first chamber is at or above the screen;
a third tank fluidly coupled to the second tank via the flow path, wherein the third tank is configured to receive product from the second tank;
wherein the row unit is fluidly coupled via the flow path to the third tank;
wherein the row unit is configured to dispense product that is received from the third tank via the flow path.

2. The seeder assembly of claim 1, wherein the second tank further comprises:
an inlet fluidly coupled to the first tank via the flow path; and
an outlet fluidly coupled to the inlet, the outlet being fluidly coupled to the third tank via the flow path.

3. The seeder assembly of claim 2, wherein the first chamber is fluidly coupled to the inlet the second chamber is fluidly coupled to the first chamber and the outlet, and the screen comprises a first end and a second end, wherein the second end of the screen is located at least partially in the first chamber, and the first end of the screen is located above the second end;
wherein the screen partially separates the first chamber from the second chamber;
wherein the inlet is located at or above the screen, and
wherein the screen retains product in the first chamber until the height of the product is at or above the first end.

4. The seeder assembly of claim 1, wherein the outlet is fluidly coupled to two or more third tanks.

5. The seeder assembly of claim 1, further comprising a meter coupled to the first tank;
wherein the meter is coupled between the first tank and the flow path;
wherein the meter is configured to control the flow of product distributed from the first tank to the flow path;
wherein the meter is coupled to a controller, wherein the controller is configured to control the meter.

6. The seeder assembly of claim 1, further comprising a first sensor coupled to the second tank on the first chamber;

wherein the first sensor is configured to detect when the product collected in the first chamber reaches a first height.

7. The seeder assembly of claim 6, further comprising:

a meter coupled between the first tank and the flow path and is configured to control the flow of product distributed from the first tank into the flow path;

a first controller coupled to the meter, wherein the first controller is configured to control an output of the meter; and a second controller coupled to the first sensor;

wherein the second controller is configured to communicate an input to the first controller;

wherein the first controller receives the input from the second controller and communicates an output to the meter;

wherein the output to the meter is configured to regulate a rate at which product is distributed from the first tank into the flow path.

8. The seeder assembly of claim 6, further comprising:

a controller coupled to the first sensor; and a status indicator in communication with the controller;

wherein the controller receives an input from the first sensor, the controller configured to send the input to the status indicator.

9. The seeder assembly of claim 6, further comprising:

a second sensor coupled to the second tank in the first chamber;

wherein the second sensor is configured to detect when the product collected in the first chamber reaches the second height;

further wherein the first height is greater than the second height.

10. The seeder assembly of claim 9, further comprising:

a controller coupled to the first and second sensors; and a status indicator coupled to the controller;

wherein the controller is configured to receive input from the first or second sensor;

wherein the controller is configured to communicate the input to the status indicator.

11. The seeder assembly of claim 10, further comprising a third sensor coupled to the row unit, wherein the third sensor is configured to determine an amount of product being distributed from the row unit.

12. The seeder assembly of claim 9, further comprising:

a meter coupled between the first tank and the flow path, the meter configured to control the flow of product distributed from the first tank into the flow path;

a first controller coupled to and disposed in communication with the meter; and a second controller coupled to the first sensor and the second sensor;

wherein the second controller is configured to communicate an input to the first controller;

wherein the first controller is configured to receive the input from the second controller and sends the input to the meter;

wherein the input from the first controller is configured to regulate the rate at which the product is distributed from the first tank into the flow path.

13. The seeder assembly of claim 1, further comprising a load cell coupled to the second tank, wherein the load cell is configured to detect a force applied to it.

14. A method for distributing product from a seeder assembly, the method comprising:

providing a first tank, a second tank, a third tank, a row unit, and a fan;

storing the product in the first tank;

producing a fluid flow in a flow path between the first tank and the row unit via the fan;

dispensing product from the first tank into the airflow and to the second tank via the flow path;

collecting the product in a first chamber of the second tank while air passes through a screen and into a second chamber of the second tank when a height of the product in the first chamber is at or above the screen;

transferring product from the second tank to the third tank via the flow path;

sending product from the third tank to the row unit via the flow path; and releasing product from the row unit to an underlying ground.

15. The method of claim 14, wherein the dispensing product comprises:

passing the product through an inlet and into a first chamber of the second tank via the flow path collecting product in the first chamber until the product reaches a height of the screen;

moving product to the second chamber of the second tank when product in the first chamber exceeds the height of the screen; and flowing product out of an outlet of the second tank via the flow path.

16. The method of claim 14, further comprising:

detecting via a first sensor an amount of product collecting in the first chamber;

communicating the amount of product collected in the first chamber to a status indicator via the first sensor; and outputting the amount of product in the first chamber via the status indicator.

17. The method of claim 16, further comprising:

detecting via a second sensor the amount of product collected in the first chamber;

communicating the amount of product in the first chamber via the second sensor to the status indicator.

18. A tank for a seeder assembly comprising:

an inlet and an outlet;

a first chamber fluidly coupled to the inlet;

a second chamber fluidly coupled between the first chamber and the outlet; and a screen with a first end and a second end, the screen being located between the first chamber and the second chamber and the first end thereof being located above the second end;

wherein the screen partially separates the first chamber from the second chamber and is configured to permit air flow therethrough while retaining product in the first chamber;

wherein the inlet is located at or above the first end of the screen, and wherein the tank is configured such that product collects in the first chamber while air passes through the screen and the product remains in the first chamber until a height of the product in the first chamber is at or above the first end of the screen.

19. The seeder assembly tank of claim 18, further comprising a first sensor coupled to the tank and configured to detect when product reaches a first threshold level.

20. The seeder assembly tank of claim 19, further comprising a second sensor coupled to the tank and configured to detect when product reaches a second threshold level.

* * * * *